W. Richards,
Gas Meter.
No. 27,567. Patented Mar. 20, 1860.
Sheet 1 - 2 Sheets.
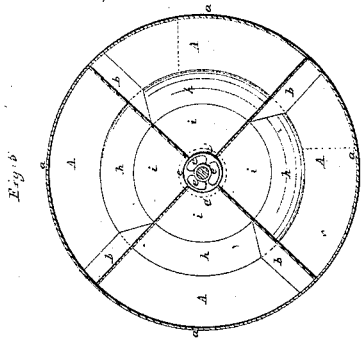
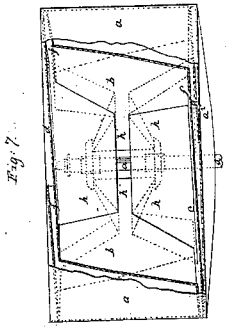
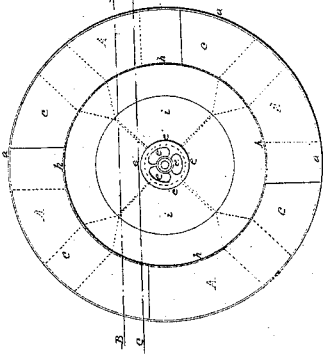
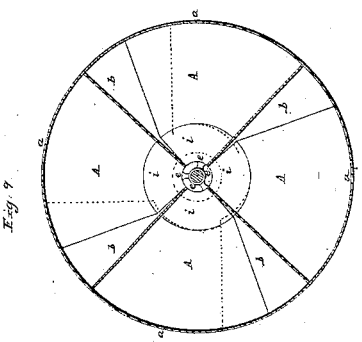
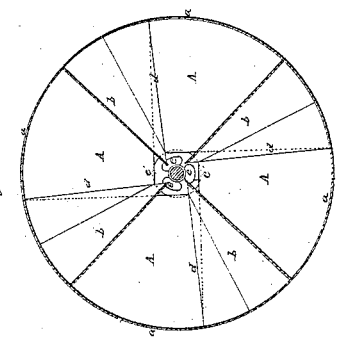
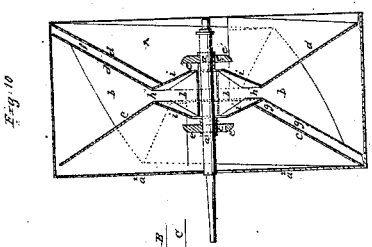
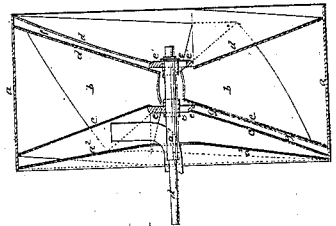
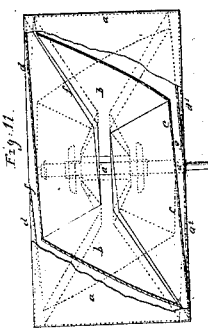
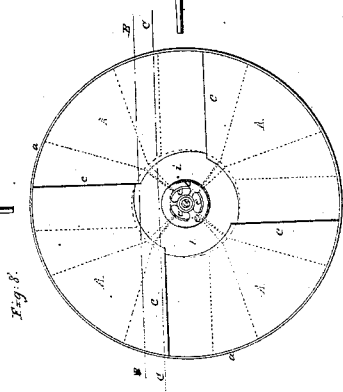
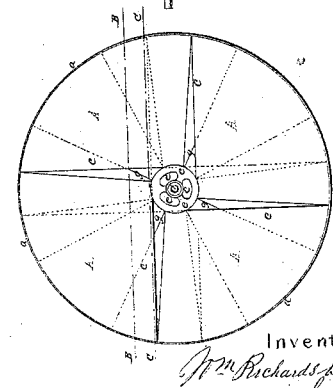
Witnesses:
Inventor:
Wm Richards Sheet 2-2 Sheets.
W. Richards,
Gas Meter,
Nº 27,567.   Patented Mar. 20, 1860.
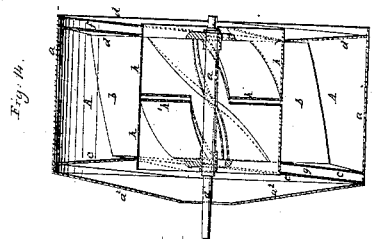
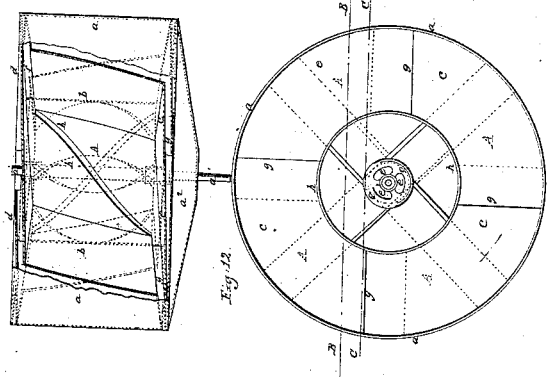
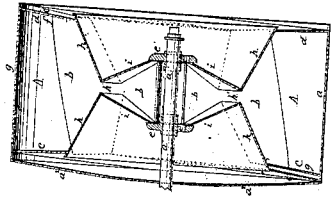
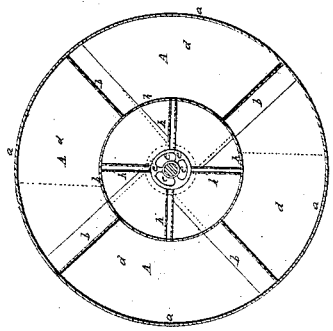
Witnesses:   Inventor

UNITED STATES PATENT OFFICE.

WILLIAM RICHARDS, OF BARCELONA, SPAIN.

WET-GAS METER.

Specification of Letters Patent No. 27,567, dated March 20, 1860.

*To all whom it may concern:*

Be it known that I, WILLIAM RICHARDS, of the gas works, Barcelona, in the Kingdom of Spain, a subject of the Queen of Great Britain, have invented or discovered new and useful Improvements in Water-Gas Meters; and I, the said WILLIAM RICHARDS, do hereby declare the nature of the said invention and in what manner the same is to be performed to be particularly described and ascertained, in and by the following statement thereof, that is to say—

The improvements relate to the construction of the revolving cylinder or series of measuring chambers of water gas meters in order to reduce as much as possible the amount of variation in the quantity of gas measured by any variations between the maximum and minimum height of water or other such fluid in the meters. For this purpose I form each of the measuring compartments with a diminished measuring capacity toward or at the axis thereof while at the same time the water or other fluid employed to aid in the measurement is permitted freely to pass to and from these chambers at such parts. But that the nature of these my improvements and the means which I adopt in carrying the same into effect may be fully understood I will proceed to describe the drawings annexed.

In the drawings Figure 1 shows a side view with the "hollow cover" removed. Fig. 2 a sectional side view and Fig. 3 a transverse section of a drum with compartments according to one modification of my invention.

$a$ is the outer cylinder or drum of the series of chambers A A A A and $a'$ is the axis thereof which is supported as is well understood by persons acquainted with the construction of water gas meters in an outer case or chamber but as my present improvements relate only to the inner rotating drum or wheel or series of chambers I have not thought it necessary to show or to enter into any description of the other and well known parts of the meter.

$a^2$ is the "hollow cover."

$b$, $b$ are partitions extending from the outer cylinder or drum $a$ toward the center so as in that direction to form the drum into compartments while there are other parts $c$, $d$ inclining therefrom in a direction across the axis $a'$ and so as to complete the desired chambers A. And it will be seen that these parts $c$ and $d$ which in fact form the sides of the respective chambers or compartments A incline from the periphery of the drum $a$ in a direction toward each other as they approach the axis $a'$ where the water or other fluid is allowed to pass by the passages $e$, $e$ in the connecting rings $e'$, and it is by this means according to this modification that a reduction in the capacity of the measuring compartments of the meter is obtained near the axis $a'$. And supposing the line B to represent the maximum or highest water line and the line C to represent the minimum or lowest any variation in the height of the fluid between these two will make but a slight variation in the measuring capacity of each chamber A.

The partitions $b$, $b$ are each placed at an angle across the axis of the drum in order to offer less resistance to the passage of the drum or wheel through the water. The gas enters into the respective compartments by the ways $f$ and thence away therefrom when measured by the passages $g$ and I so arrange the proportions of these inlet and outlet passages to each measuring chamber that the capacity of water entering by each inlet passage $f$ shall be as nearly as possible equal to the quantity of gas replacing the water at the outlet.

The object of my improvements may be obtained without having the sides $c$, $d$ of the measuring compartments inclined toward the center by forming these parts of the meter with a central drum open so as to allow of the water or other fluid employed freely passing to and from each of such chambers, and I would remark that I am aware that the revolving drums or series of measuring chambers of gas meters have heretofore been constructed with internal drums toward the axis or center thereof and I do not lay any claim to such when separately considered but to the best of my belief all such internal drums as heretofore constructed have been entire that is they have been formed without channels to admit the water or other fluid to act upon the gas therein.

Fig. 4 shows a side view with the "hollow cover" $a^2$ removed; Fig. 5 a sectional side view; Fig. 6 a transverse section of a drum or series of measuring compartments of a water gas meter according to this modification of the improvements; Fig. 7 shows a plan of the same with part of the outer rim or cylinder removed in order to the interior being better understood.

In each of these views corresponding parts are indicated by the same letters used to describe the previous figures.

It will be seen that the sides $c\ d$ are parallel or nearly so and with the parts $b$ are connected to the internal drum $h$ and this drum is divided into two parts by means of the channel $h'$ from which there are inclosing sides $i, i$ to the passages $e$ in order that the water or other fluid passing by the channels $e$ may seal the passage between the plates $i, i$ to the chambers A and that these chambers may be kept distinct at such parts the plates $b$ are in this arrangement continued through the channels $h'$ and between the plates $i\ i$ to the rings $e'$. Figs. 8, 9, 10 and 11 show similar views of a drum in which the different arrangements shown and described are to some extent combined. The sides $c, d$ incline in a direction toward each other as they approach the center or axis $a$ to the point $h'$ where they are connected to side pieces $i, i$ forming chambers similar to those described in respect of Figs. 4, 5, 6 and 7.

Fig. 12 shows a side view with the "hollow cover" $a^2$ removed. Fig. 13 a sectional side view and Fig. 14 a transverse section of another modification. Fig. 15 shows a plan of the same with part of the outer rim or cylinder removed in order to the interior being better understood. In this case the opening $h'$ in the drum $h$ to each chamber A is formed in a spiral direction in relation to the axis $a'$ and the passages thereto for the water or other fluid are of a similar form, but as in other respects the arrangement is similar to those last described. I have not thought it necessary further to describe the parts and have marked them with the corresponding letters of reference.

Having thus described the nature of my said improvements and in what manner I carry the same into effect I would have it understood that I do not confine myself to the precise details shown and described as these may be varied without departing from the peculiar character of my invention, but

What I do claim is—

The adaptation and combination of means in water gas meters whereby the more accurate admeasurement of gas may be obtained substantially as explained.

In testimony whereof I have signed my name to this specification before two subscribing witnesses.

WILLIAM RICHARDS.

Witnesses:
JOHN SANFORD,
WILLIAM BROOKES.